United States Patent

Sugahara et al.

[11] Patent Number: 5,987,261
[45] Date of Patent: Nov. 16, 1999

[54] STROBE DEVICE

[75] Inventors: Takuro Sugahara, Kokubunji; Yoshinao Shimada, Hachioji, both of Japan

[73] Assignee: Olympus Optical Co., Ltd., Tokyo, Japan

[21] Appl. No.: 09/153,414

[22] Filed: Sep. 9, 1998

[30] Foreign Application Priority Data

Sep. 9, 1997 [JP] Japan ................................. 9-244487

[51] Int. Cl.$^6$ ................ G03B 15/03; H04N 5/222; H04N 5/235
[52] U.S. Cl. .................. 396/61; 396/157; 348/229; 348/371
[58] Field of Search ............. 396/61, 157; 348/370, 348/371, 229, 300

[56] References Cited

U.S. PATENT DOCUMENTS

| | | | |
|---|---|---|---|
| 4,354,751 | 10/1982 | Izumi et al. | 396/61 |
| 4,768,876 | 9/1988 | Okino | 348/371 X |
| 4,903,136 | 2/1990 | Iketani | 348/229 |
| 4,951,077 | 8/1990 | Kaneko et al. | 396/61 |
| 4,954,897 | 9/1990 | Ejima et al. | 348/229 |
| 5,097,340 | 3/1992 | Tanabe et al. | 348/371 |
| 5,410,225 | 4/1995 | Ishi et al. | 348/229 |
| 5,822,624 | 10/1998 | Fukuhara et al. | 396/61 |
| 5,860,029 | 1/1999 | Ichikawa et al. | 396/61 |

FOREIGN PATENT DOCUMENTS 59-119337 7/1984 Japan.
3-126383 5/1991 Japan.

*Primary Examiner*—W. B. Perkey
*Attorney, Agent, or Firm*—Louise Weinstein

[57] ABSTRACT

A strobe device including a preparatory light radiator for generating a fixed amount of preparatory light a plurality of times to set an amount of actual light to be generated when radiating supplementary light onto a subject during photographing; an image pickup element for receiving a fixed amount of preparatory light, generated a plurality of times by the preparatory light radiator, and photoelectrically converting light reflected from the subject; an amplifier for amplifying the photoelectrically converted signal during the plurality of times of generating preparatory light, by an amplification factor which differs for each generation of preparatory light; a detector for detecting whether the average level of signals being output from the amplifier, for each generation of preparatory light, is within a predetermined range; and a calculator for calculating an amount of actual light to be generated based on signals output from the amplifier when the detector has determined that the average level of signals output from the amplifier is within the predetermined range.

3 Claims, 7 Drawing Sheets

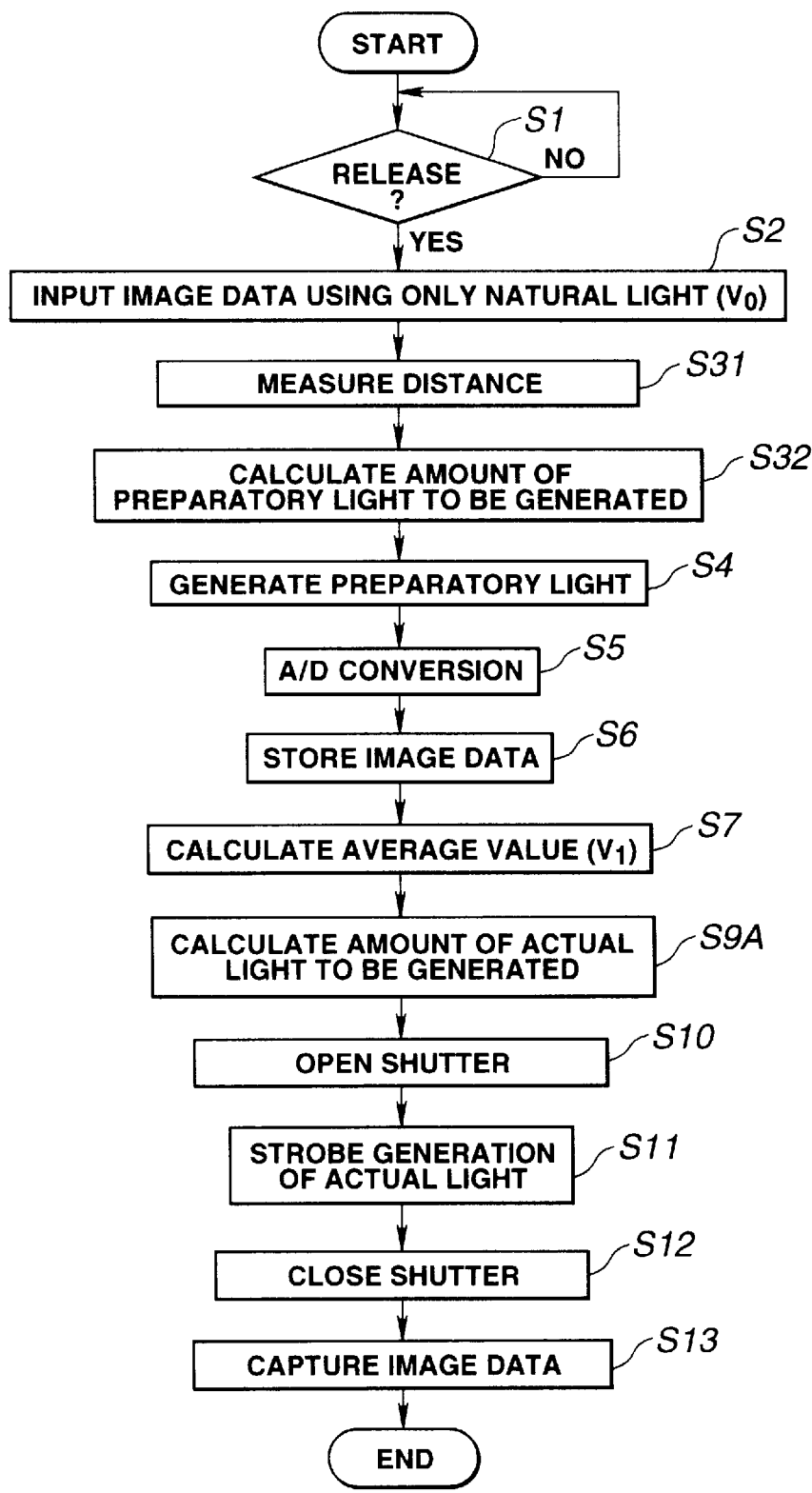

STROBE DEVICE

BACKGROUND OF THE INVENTION

1. Field of the Invention

The present invention relates to a strobe device, and more particularly to a strobe device which radiates supplementary light onto a subject when photographing and generates preparatory light in order to set an amount of actual light to be generated.

2. Related Art Statement

Generally, when natural light alone is insufficient to provide the amount of light needed for photographing with an image pickup device such as a camera, a strobe device is for instance used to provide supplementary light. In this type of strobe device, the actual amount of light to be generated during exposure is set after first generating preparatory light, thereby ensuring that an appropriate amount of light is generated when photographing. When controlling the amount of generated light in this way, for instance, a controller such as disclosed in Japanese Unexamined Patent Publication No. 3-126383, which comprises a special-purpose photoreceptor for controlling the amount of light generated, is provided within the strobe device.

Furthermore, Japanese Unexamined Patent Publication No. 59-119337 discloses an electronic camera system wherein no special-purpose photoreceptor or controller are provided, the amount of light generated being set based on an integrated output.

However, according to the method of preparatory light generation disclosed in the abovementioned Japanese Unexamined Patent Publication No. 59-119337 and such like, the amount of light to be actually generated is determined based on information obtained only by a single generation of preparatory light. Consequently, not only is there a disadvantage that a sufficient amount of light cannot be obtained when radiating onto a subject at long range, but also there is a disadvantage that a subject at close range is exposed to too much light. Thus it has been difficult to obtain an appropriate amount of light.

OBJECTS AND SUMMARY OF THE INVENTION

A first object of the present invention is to provide a strobe device for generating preparatory light capable of obtaining an optimum amount of light for actual light generation.

A second object of the present invention is to provide a strobe device capable of obtaining image data which has been amplified to an optimum level for actual light generation.

A third object of the present invention is to provide a strobe device capable of generating optimum preparatory light in accordance with a close-range subject, thereby obtaining an even more optimum amount of actual light generated.

A fourth object of the present invention is to provide a strobe device capable of obtaining an optimum amount of light in actual light generation without providing an amplifier.

Briefly, the strobe device of the present invention comprises:

preparatory light radiating means for generating a fixed amount of preparatory light a plurality of times in order to set an amount of actual light to be generated when radiating supplementary light onto a subject during photographing;

an image pickup element for receiving a fixed amount of preparatory light, generated a plurality of times by the preparatory light radiating means, and photoelectrically converting light reflected from a subject;

amplifying means for amplifying a signal output from the image pickup element, which has been photoelectrically converted during the plurality of times of generating preparatory light, by an amplification factor which differs for each generation of preparatory light;

detecting means for detecting whether the average level of signals obtained for each generation of preparatory light, the signals being output from the amplifying means, is within a predetermined range; and calculating means for calculating an amount of actual light to be generated based on signals output from the amplifying means when the detecting means has determined that the average level of signals output from the amplifying means is within the predetermined ranges.

These objects and advantages of the present invention will become further apparent from the following detailed explanation.

BRIEF DESCRIPTION OF THE DRAWINGS

FIG. 7 is a flowchart showing an operation of calculating an amount of actual light to be generated using preparatory light generation and an operation of photographing according to the fourth embodiment.

DETAILED DESCRIPTION OF THE PREFERRED EMBODIMENTS

Figure 1:
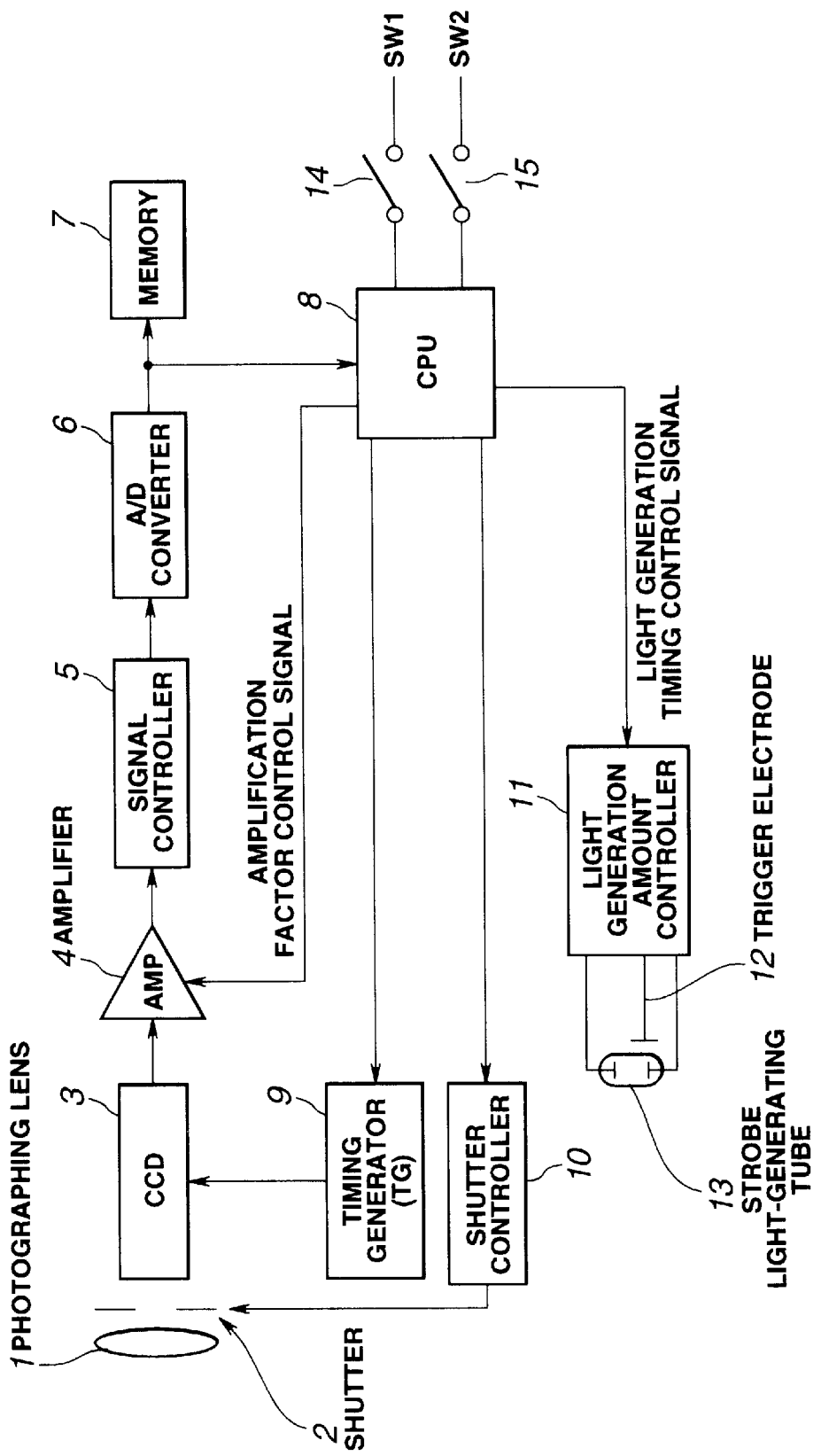
FIG. 1 is a block diagram showing the configuration of the strobe device according to a first embodiment of the present invention.

FIG. 1 is a block diagram showing the configuration of the strobe device according to a first embodiment of the present invention.

The strobe device of the present embodiment principally comprises a photographing lens 1, which light from a subject is input to, a shutter 2 which also functions as an aperture and is provided behind the photographing lens 1, a fixed image pickup element 3 such as a CCD for picking up an image of the subject whose light is input to the photographing lens 1, an amplifier 4 for amplifying an image signal picked up by the image pickup element 3, a signal processor (i.e. signal controller) 5 for sampling and holding an image signal amplified by the amplifier 4, an A/D circuit 6 for converting a signal from the signal processor from analog to digital, a memory 7 for storing a signal output from the A/D circuit 6, a CPU 8 for calculating the amount of light to be generated in a strobe light-generating tube 13, based on a signal output from the A/D circuit 6 or from the memory 7, and drive-controlling the parts that make up the strobe device, a timing generator 9 for generating a timing signal in order to drive the CCD3, a shutter controller 10 for controlling the shutter 2 in compliance with the CPU 8, a strobe light-generating tube 13 comprising for instance an Xc tube, a light generation amount controller 11 for controlling the amount of light generated by the strobe light-generating tube 13 in compliance with the CPU 8, a trigger electrode 12 for the strobe light-generating tube 13, a strobe light-generation mode switch (SW1) 14 which is connected to the CPU 8, and a release switch (photography operation start switch SW2) 15 which is connected to the CPU 8.

The amplifier 4 amplifies a signal output from the CCD 3 by a predetermined amplification factor based on a control signal from the CPU 8.

Furthermore, the signal processor 5 processes the image signal amplified by the amplifier 4 by performing predetermined signal processing such as gamma correction or color correction.

Furthermore, when the strobe light generation mode switch SW1 (14) switches ON, the CPU 8 generates strobe light; and, when the release switch SW2 (15) switches ON, photographing commences under the control of the CPU 8.

The operations of calculating the amount of actual light to be generated using preparatory light generation and photographing according to the strobe device of the first embodiment, having the configuration described above, will next be explained referring to the flowchart shown in FIG. 2.

The strobe device of the present embodiment is characterized in that it is determined whether or not the amplification factor of the amplifier 4 is appropriate each time preparatory light is generated.

Figure 2:
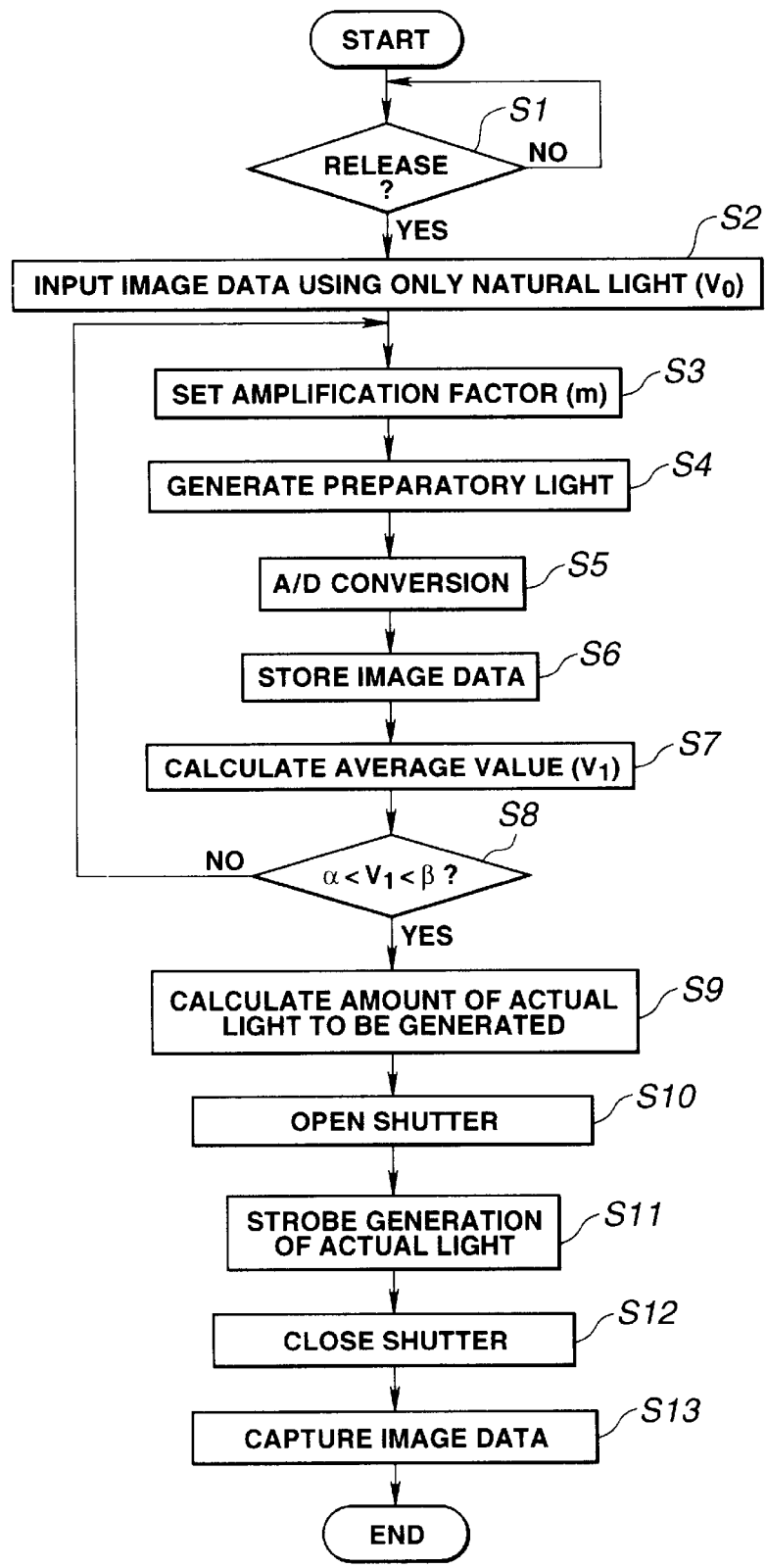
FIG. 2 is a flowchart showing an operation of calculating an amount of actual light to be generated using preparatory light generation and an operation of photographing according to the first embodiment.

As shown in FIG. 2, when the release switch 15 turns ON (Step S1), firstly, image data using only natural light is input and the CPU 8 determines the average value V0 of this natural light image data (Step S2). At this point, the amplification factor of the amplifier 4 for the image data being input is directly measured as 1.

Next, an amplification factor m is set using the average value V0 of the image data (Step S3) and preparatory light is generated at this amplification factor m in compliance with the CPU 8 (Step S4).

Thereafter, the A/D circuit 6 A/D converts the image data (Step S5), which is then stored in the memory 7 (Step S6).

Next, the average value V1 of the image data using preparatory light is determined (Step S7). Now, the amplification factor of the amplifier 4 is set to 1.

Thereafter, it is determined whether the average value V1 of the image data using preparatory light is between predetermined values α and β (Step S8). When α<V1<β, the CPU 8 calculates an amount of actual light to be generated (Step 9). The method of this calculation will be explained in detail later.

Thereafter, the CPU 8 controls the opening and shutting of the shutter 2, causes the strobe light-generating tube 13 to generate light (Steps S10, S11 and S12), and captures image data from the CCD 3 (Step S13).

Next, the method for calculating the amount of actual light generated according to the first embodiment will be explained.

Firstly, as described above, after determining the average value V0 of image data obtained using natural light and setting the amplification factor accordingly, the average value V1 of image data using preparatory light is determined. Then, after the average value V2 of the image data after amplification has been determined, an appropriate level V3 of image data using actual light generation is determined. Actual light generation is carried out using an amplification factor of 1.

The amplification factor is set to 1 when generating preparatory light, as described above, in order to reduce as much as possible the amount of energy wasted by the strobe when generating preparatory light, and thereby more accurately calculate the amount of actual light to be generated. Furthermore, the amplification factor is set to 1 when generating actual light in order to obtain noiseless image data.

Thus, having determined each value, since the average output of image data obtained using actual light generation is V3−V0, the actual light generated is K times the preparatory light, that is:

$$K=(V3-V0)/V1$$

where V1=(V2/m)−V0.

In fact, the CPU 8 determines the time of actual light generation by referring to an LUT (Look Up Table) in which the relation between K and light generating time (t) is stored.

When measuring using only natural light or preparatory light, the entire screen can be partitioned into 64 regions so that the image pickup element need only determine data comprising the average of pixel data in each region calculated using the hardware. This method enables processing to be performed at high speed.

According to the strobe device of the first embodiment, image data of an appropriate level can be obtained when generating actual light.

Next, a second embodiment of the present invention will be explained.

The strobe device of the second embodiment has the same configuration as the first embodiment already described, and differs only with respect to the operation of calculating the amount of light based on preparatory light generation. Therefore, mention will be made only to the differences between the embodiments; detailed explanation of identical parts will be omitted.

Figure 3:
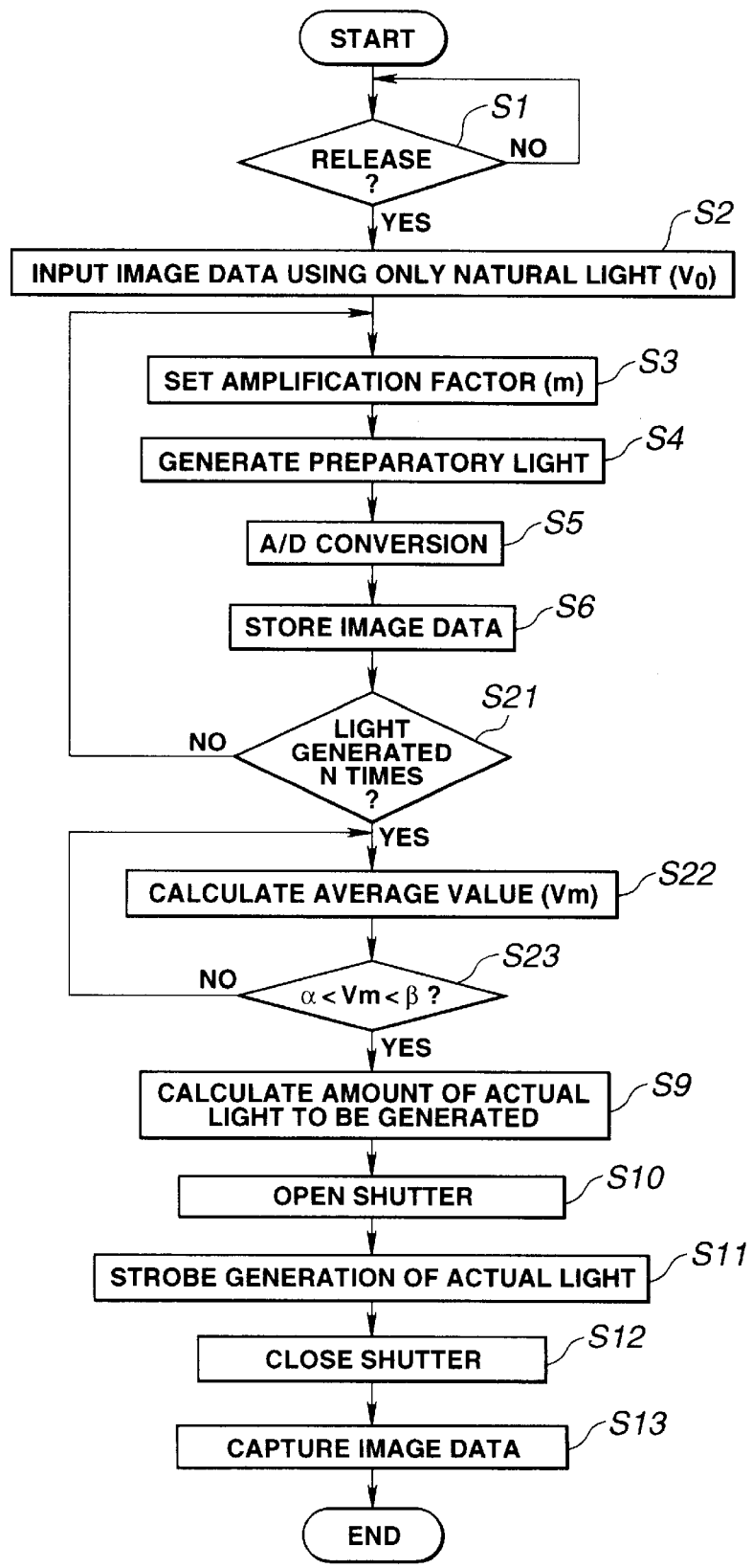
FIG. 3 is a flowchart showing an operation of calculating an amount of actual light to be generated using preparatory light generation and an operation of photographing according to a second embodiment of the present invention.

FIG. 3 shows a flowchart illustrating the operations of calculating the amount of actual light to be generated using preparatory light generation and photographing according to the strobe device of the second embodiment.

As shown in FIG. 3, when the release switch 15 turns ON (Step S1), firstly, image data using only natural light is input and the CPU 8 determines the average value V0 of this natural light image data (Step S2). From this point up to Step S6, the process is identical to the first embodiment already described, and explanation will here be omitted.

Next, it is determined whether or not preparatory light has been generated N times (Step S21). When preparatory light has been generated N times, an average value Vm of the image data of each preparatory light generation is calculated (Step S22), and it is determined whether the average value Vm of the image data of each preparatory light generation is between predetermined values α and β (Step S23). When α<V1<β, the CPU 8 calculates an amount of actual light to be generated (Step 9). The method of this calculation is the same as in the first embodiment described above.

Thereafter, the CPU 8 controls the opening and shutting of the shutter 2, causes the strobe light-generating tube 13 to generate light (Steps S10, S11 and S12), and captures image data from the CCD 3 (Step S13).

According to the strobe device of the second embodiment, image data of an even more appropriate level can be obtained when generating actual light.

Next, a third embodiment of the present invention will be explained.

Figure 4:
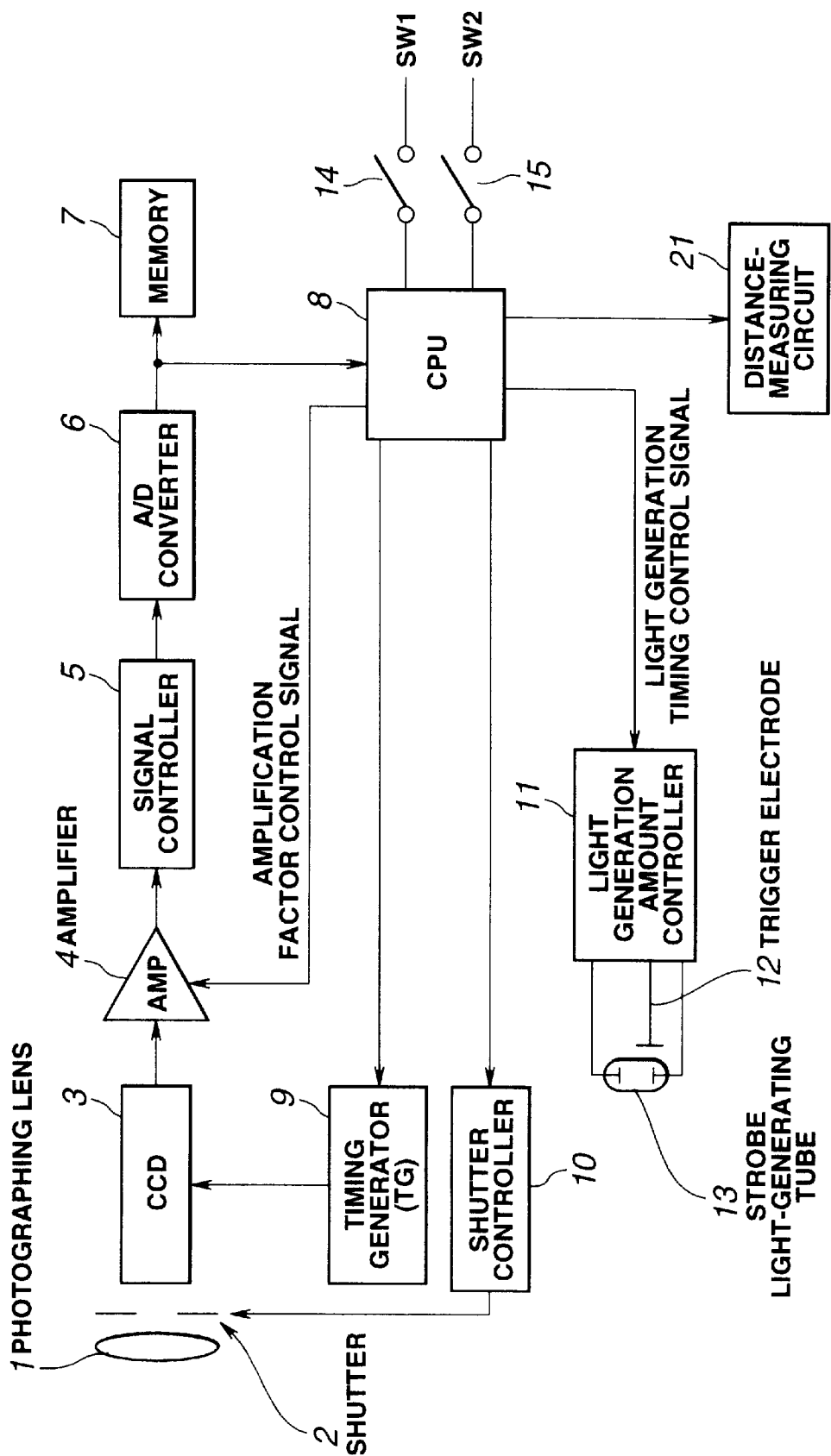
FIG. 4 is a block diagram showing the configuration of the strobe device according to a third embodiment of the present invention.

FIG. 4 is a block diagram showing the configuration of the strobe device according to the third embodiment of the present invention. Like configuration elements to the first embodiment are designated by like reference characters and explanation is omitted here.

The basic configuration of strobe device of the third embodiment is the same as the first embodiment described above, but is characterized in that the amount of preparatory light generated is calculated based on distance measurements taken by a distance-measuring circuit 21.

Figure 5:
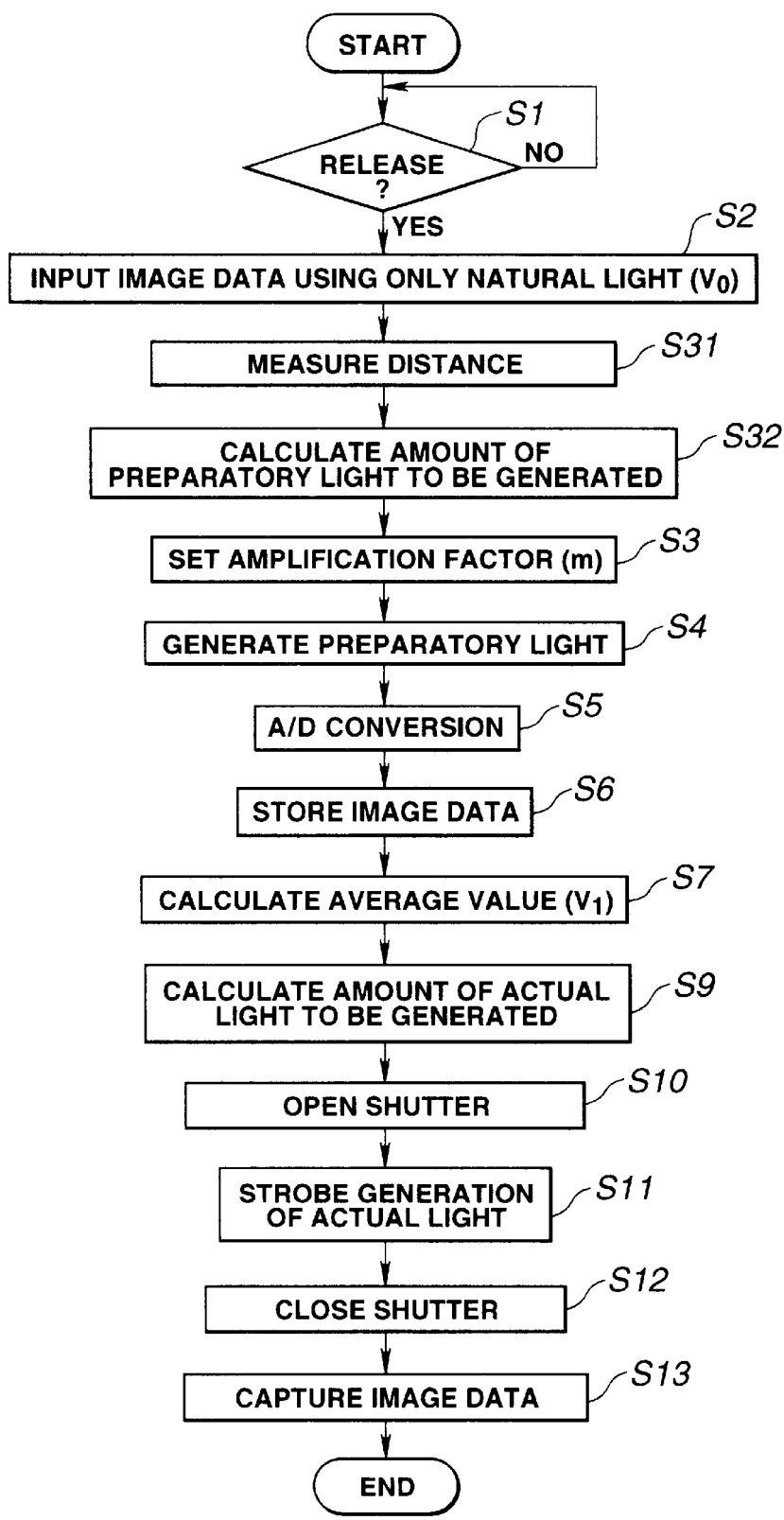
FIG. 5 is a flowchart showing an operation of calculating an amount of actual light to be generated using preparatory light generation and an operation of photographing according to the third embodiment.

FIG. 5 shows a flowchart illustrating operations of calculating an amount of actual light to be generated using generation of preparatory light and photographing in the strobe device according to the third embodiment.

The strobe device of the third embodiment is characterized in that distance to the subject is measured prior to generating preparatory light and the amount of preparatory light generated is calculated based on this distance measurement.

As shown in FIG. 5, when the release switch 15 turns ON (Step S1), firstly, image data using only natural light is input and the CPU 8 determines the average value V0 of this natural light image data (Step S2).

Next, a distance-measuring circuit 21, controlled by the CPU 8, measures the distance to the subject (Step 31). Then, the amount of preparatory light needed to be generated is calculated based on this measurement (Step S32) and the amplification factor m is set based on the amount of light calculated (Step S3).

That is, by measuring the distance to the subject, it is possible to set more light to be generated when the subject is farther away than when the subject is at close range. The amount of light generated may be set in proportion to the square of the distance to the subject. Or, it may be set to a suitable value determined by experience.

Next, preparatory light is generated based on the amplification factor m in compliance with the CPU 8 (Step S4). Thereafter, the A/D circuit 6 A/D converts the image data (Step S5), which is then stored in the memory 7 (Step S6).

Next, the average value V1 of the image data using preparatory light is determined (Step S7) and the CPU 8 calculates the amount of actual light to be generated (Step 9). The method of calculation is the same as in the first embodiment described above.

Thereafter, the CPU 8 controls the opening and shutting of the shutter 2, causes the strobe light-generating tube 13 to generate light (Steps S10, S11 and S12), and captures image data from the CCD 3 (Step S13).

According to the third embodiment, an optimum amount of preparatory light can be generated in accordance with the distance to the subject, enabling a still more optimum amount of light to be obtained.

Next, a fourth embodiment of the present invention will be explained.

Figure 6:
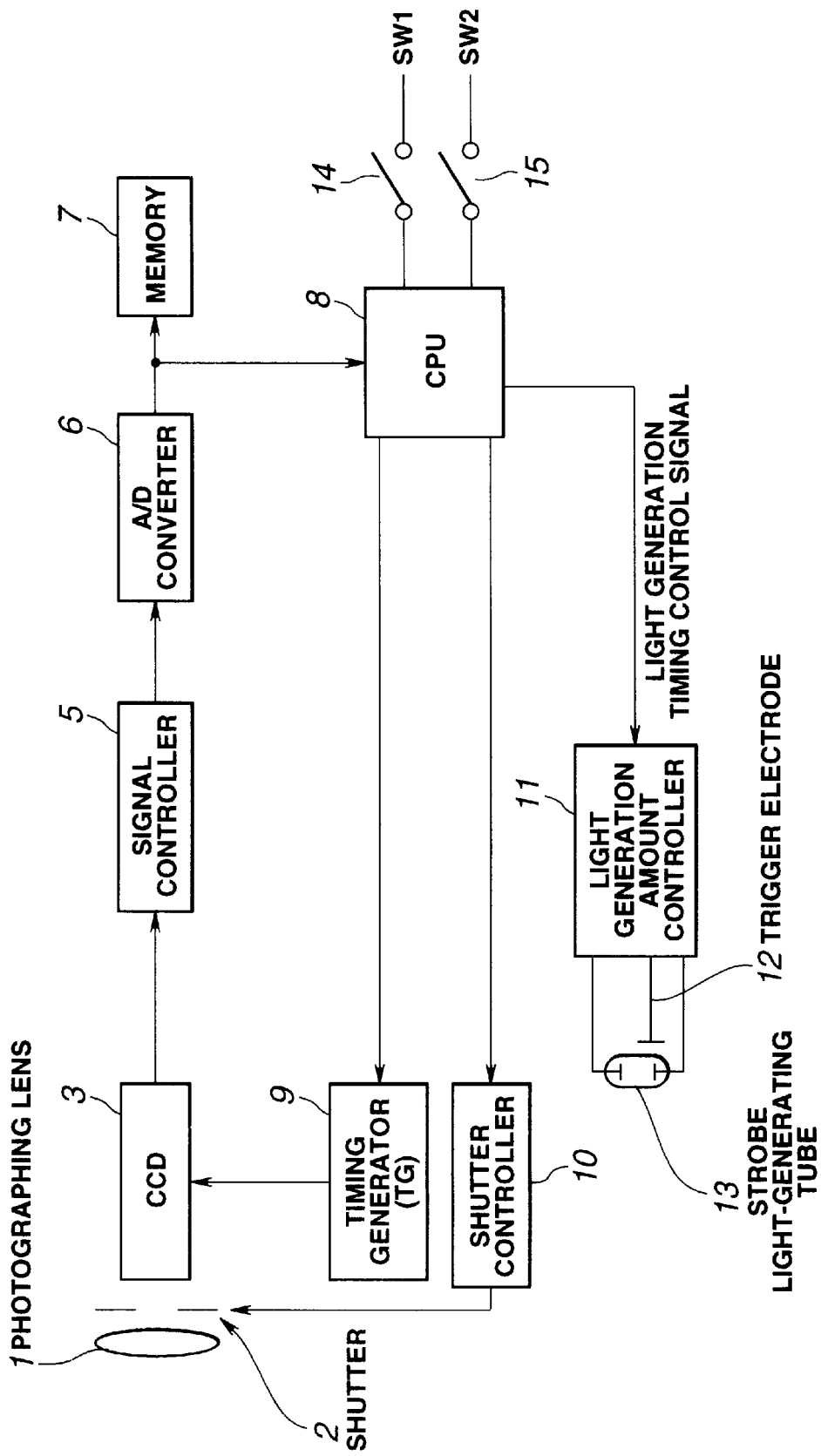
FIG. 6 is a block diagram showing the configuration of the strobe device according to a fourth embodiment of the present invention.

FIG. 6 is a block diagram showing the configuration of the strobe device according to a fourth embodiment of the present invention. Like configuration elements to the first embodiment are designated by like reference characters and explanation of such like elements is omitted here.

The basic configuration of the fourth embodiment is the same as the first embodiment described above, but is characterized in that the amplifier 4 is omitted and the amount of preparatory light generated is calculated based on distance measurements.

FIG. 7 is a flowchart showing operations of calculating an amount of actual light to be generated using preparatory light generation and photographing according to the strobe device of the fourth embodiment.

In the strobe device of the present embodiment, the distance to the subject is measured prior to generating preparatory light, as in the third embodiment, and the amount of preparatory light generated is calculated based this distance measurement.

As shown in FIG. 7, when the release switch 15 turns ON (Step S1), firstly, image data using only natural light is input and the CPU 8 determines the average value V0 of this natural light image data (Step S2).

Next, the distance-measuring circuit 21, controlled by the CPU 8, measures the distance to the subject (Step 31). Then, the amount of preparatory light needed to be generated is calculated based on this measurement (Step S32).

That is, by measuring the distance to the subject, it is possible to set more light to be generated when the subject is farther away than when the subject is at close range. The amount of light generated may be set in proportion to the square of the distance to the subject. Or, it may be set to a suitable value determined by experience.

Next, preparatory light is generated in compliance with the CPU 8 (Step S4). Thereafter, the A/D circuit 6 A/D converts the image data (Step S5), which is then stored in the memory 7 (Step S6).

Next, the average value V1 of the image data using preparatory light is determined (Step S7) and the CPU 8 calculates the amount of actual light to be generated (Step S9A). The method of calculation will be explained later.

Thereafter, the CPU 8 controls the opening and shutting of the shutter 2, causes the strobe light-generating tube 13 to generate light (Steps S10, S11 and S12), and captures image data from the CCD 3 (Step S13).

Next, the method for calculating the amount of actual light to be generated according to the fourth embodiment will be explained.

Firstly, as described above, the average value V0 of image data obtained using natural light and the average value V1 of image data using preparatory light are determined. Then, the appropriate level V3 of image data for actual light generation is set to a suitable value, determined by experience or the like.

Thus, having determined each value, since the average output of image data obtained using actual light generation is V3−V0, the actual light generated is K times the preparatory light, that is:

$$K=(V3-V0)/V1$$

where V1=(V2/m)−V0.

In fact, as in the embodiments already described, the CPU 8 determines the period of actual light generation by referring to an LUT (Look Up Table) in which the relation between K and light generating time (t) is stored.

According to the strobe device of the fourth embodiment, an optimum amount of actual light generated can be obtained without providing an amplifier.

As explained above, according to the present invention, it is possible to provide a strobe device capable of obtaining an optimum amount of actual light generated by generating preparatory light.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A strobe device, comprising:

preparatory light radiating means for generating a fixed amount of preparatory light a plurality of times in order to set an amount of actual light to be generated when radiating supplementary light onto a subject during photographing;

an image pickup element for receiving a fixed amount of preparatory light, generated a plurality of times by said preparatory light radiating means, and photoelectrically converting light reflected from a subject;

amplifying means for amplifying a signal output from said image pickup element, which has been photoelectrically converted during said plurality of times of generating preparatory light, by an amplification factor which differs for each generation of preparatory light;

detecting means for detecting whether an average level of signals obtained for each said generation of preparatory light, said signals being output from said amplifying means, is within a predetermined range; and calculating means for calculating an amount of actual light to be generated based on signals output from said amplifying means when said detecting means has determined that an average level of signals output from said amplifying means is within said predetermined range.

2. A strobe device, comprising:

preparatory light radiating means for generating preparatory light in order to set an amount of actual light to be generated when radiating supplementary light onto a subject during photographing;

an image pickup element for receiving preparatory light, generated by said preparatory light radiating means, and photoelectrically converting light reflected from a subject;

distance-measuring means for measuring distance to a subject;

amplifying means for amplifying a signal output from said image pickup element, which has been photoelectrically converted during said preparatory light generation, by an amplification factor which is predetermined in compliance with distance information measured by said distance-measuring means; and calculating means for calculating an amount of actual light to be generated based on a signal output from said amplifying means.

3. A strobe device, comprising:

preparatory light radiating means for generating preparatory light in order to set an amount of actual light to be generated when radiating supplementary light onto a subject during photographing;

an image pickup element for receiving preparatory light, generated by said preparatory light radiating means, and photoelectrically converting light reflected from a subject;

a distance-measuring means for measuring distance to the subject;

preparatory light amount control means for controlling the amount of said preparatory light based on distance information measured by said distance-measuring means; and calculating means for calculating an amount of actual light to be generated based on a signal output from said image pickup element during said preparatory light generation.

* * * * *

UNITED STATES PATENT AND TRADEMARK OFFICE
CERTIFICATE OF CORRECTION

PATENT NO : 5,987,261
DATED : November 16, 1999
INVENTOR(S): Sugahara et al.

It is certified that error appears in the above-identified patent and that said Letters Patent are hereby corrected as shown below:

At column 2, line 18, delete "ranges" and insert therefor --range--.

Signed and Sealed this

Seventeenth Day of April, 2001

*Attest:*

NICHOLAS P. GODICI

*Attesting Officer*  *Acting Director of the United States Patent and Trademark Office*